US008788824B2

(12) United States Patent
Jonnagadla et al.

(10) Patent No.: US 8,788,824 B2
(45) Date of Patent: Jul. 22, 2014

(54) SELECTIVE ENCRYPTION IN BROKER-BASED MESSAGING SYSTEMS AND METHODS

(75) Inventors: Suresh Jonnagadla, Laurel, MD (US); Robert Daugherty, Los Angeles, CA (US); Shailender Gola, North Potomac, MD (US); Ha Tam Nham, Laurel, MD (US); Lawrence Taylor, Washington, DC (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 722 days.

(21) Appl. No.: 12/540,746

(22) Filed: Aug. 13, 2009

(65) Prior Publication Data
US 2011/0040973 A1 Feb. 17, 2011

(51) Int. Cl.
*H04L 9/00* (2006.01)
(52) U.S. Cl.
USPC .............. 713/170; 713/1; 380/279; 380/285
(58) Field of Classification Search
CPC ..... G06F 21/60; G06F 21/602; H04L 63/471; H04L 9/083
USPC ................................ 713/170, 1; 380/279, 286
See application file for complete search history.

(56) References Cited

U.S. PATENT DOCUMENTS

| | | | | |
|---|---|---|---|---|
| 6,681,327 | B1 * | 1/2004 | Jardin | 713/153 |
| 6,697,824 | B1 * | 2/2004 | Bowman-Amuah | 709/229 |
| 6,904,449 | B1 * | 6/2005 | Quinones | 709/203 |
| 7,043,731 | B2 * | 5/2006 | Ramaswamy | 718/105 |
| 7,383,439 | B2 * | 6/2008 | Price et al. | 713/170 |
| 8,122,118 | B2 * | 2/2012 | Hickson et al. | 709/224 |
| 8,422,687 | B2 * | 4/2013 | Oksman et al. | 380/279 |
| 2003/0069980 | A1 * | 4/2003 | Picca et al. | 709/227 |
| 2003/0225693 | A1 * | 12/2003 | Ballard et al. | 705/42 |
| 2004/0025014 | A1 * | 2/2004 | Kaler et al. | 713/163 |
| 2005/0216754 | A1 * | 9/2005 | Ehud | 713/193 |
| 2005/0268241 | A1 * | 12/2005 | Lerner | 715/749 |
| 2006/0178918 | A1 * | 8/2006 | Mikurak | 705/7 |
| 2007/0011737 | A1 * | 1/2007 | Bandini et al. | 726/14 |
| 2007/0067403 | A1 * | 3/2007 | Holmes | 709/206 |
| 2007/0189542 | A1 * | 8/2007 | Alldredge | 380/283 |
| 2009/0296924 | A1 * | 12/2009 | Oksman et al. | 380/30 |
| 2010/0067695 | A1 * | 3/2010 | Liao et al. | 380/255 |
| 2010/0142707 | A1 * | 6/2010 | Han et al. | 380/255 |
| 2010/0223560 | A1 * | 9/2010 | Shenfield et al. | 715/744 |

OTHER PUBLICATIONS

Kareem Yusuf. "Enterprise Messaging Using JMS and IBM® WebSphere®" © 2004 IBM Press. Excerpts from Chapters 5 & 7 (pp. 67-86, 109-110, and 165-189).*
Anthony O'Dowd. "CCR2: A publication for the IBM System z software community: How to use Websphere Message Broker to extend MQ and exploit DataPower for Web services security processing" CCR2, Issue 07—2007 (4 pages) http://www-01.ibm.com/software/tivoli/features/ccr2/ccr2-2007-08/security-processing.html.*
"DataPower Architectural Design Patterns: Integrating and Securing Services Across Domains" First Edition, Oct. 2008 © 2008 IBM (240 pages) http://www.redbooks.ibm.com/redbooks/pdfs/sg247620.pdf.*

* cited by examiner

*Primary Examiner* — Beemet Dada
*Assistant Examiner* — Thomas Gyorfi

(57) ABSTRACT

An exemplary method includes transmitting, by a software application subsystem, a request to an encryption services subsystem to route a message generated by an originating software application to a recipient software application through a message broker subsystem, acquiring, by the software application subsystem, data representative of a current encryption configuration of the message broker subsystem from the encryption services subsystem in response to the request, and determining, by the software application subsystem, during a run time of the originating software application whether to encrypt the message before the message is transmitted to the message broker subsystem for routing to the recipient software application, the determination based at least in part on the current encryption configuration of the message broker subsystem. Corresponding methods and systems are also disclosed.

25 Claims, 11 Drawing Sheets

SELECTIVE ENCRYPTION IN BROKER-BASED MESSAGING SYSTEMS AND METHODS

BACKGROUND INFORMATION

Message-oriented middleware is infrastructure that increases the interoperability, portability, and flexibility of software applications by allowing the software applications to communicate one with another by transmitting messages therebetween. Message-oriented middleware reduces the complexity of developing software applications that span multiple operating systems and network protocols by insulating application developers from the details of the various operating system and network interfaces. Accordingly, software developers can more easily integrate new software applications with existing software applications.

Typical message-oriented middleware configurations allow messages to be transmitted between software applications as cleartext only. However, it is often desirable to encrypt messages transmitted between software applications. Moreover, it is often desirable to selectively determine at run time of the software applications whether to transmit messages in encrypted form or in cleartext form.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
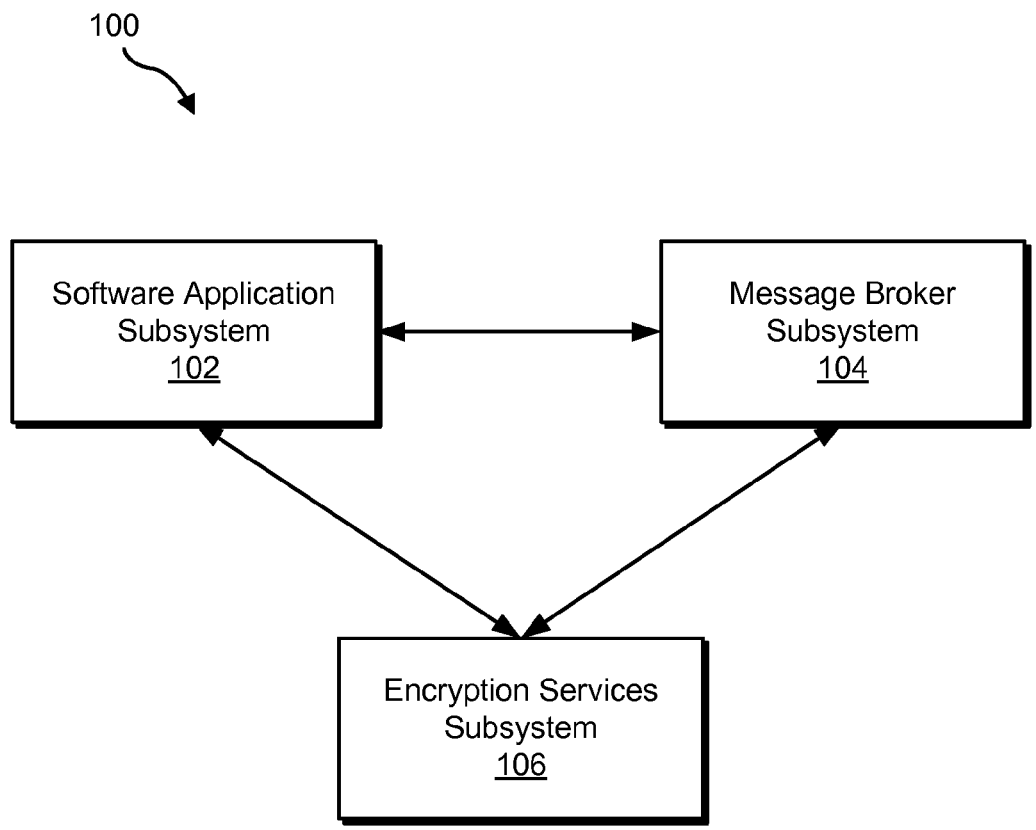
FIG. 1 illustrates an exemplary broker-based messaging system according to principles disclosed herein.

Exemplary methods and systems for selective encryption of messages transmitted in broker-based messaging systems are described herein. As described in more detail below, an originating software application may generate a message to be routed to a recipient software application through a message broker subsystem. In some examples, it may be desirable to encrypt the message before it is transmitted to the message broker subsystem by a software application subsystem configured to execute the originating software application. Additionally or alternatively, it may be desirable for the message broker subsystem to encrypt the message before it is routed to the recipient software application.

To this end, the software application subsystem configured to execute the originating software application may transmit a request to an encryption services subsystem to route the message generated by the originating software application to the recipient software application through the message broker subsystem. The software application subsystem may acquire data representative of a current encryption configuration of the message broker subsystem from the encryption services subsystem in response to the request. The software application subsystem may use the acquired data to determine during a run time of the originating software application whether to encrypt the message before the message is transmitted to the message broker subsystem for routing to the recipient software application.

If the data representative of the current encryption configuration of the message broker subsystem indicates that the message broker subsystem is currently configured to accept encrypted messages, the software application subsystem may encrypt and transmit the message to the message broker subsystem over a secure connection. Alternatively, if the data representative of the current encryption configuration of the message broker subsystem indicates that the message broker subsystem is not currently configured to accept encrypted messages, the software application subsystem may transmit the message to the message broker subsystem as cleartext over a non-secure connection.

Once the message has been transmitted to the message broker subsystem in either encrypted or cleartext form, the message broker subsystem may acquire data representative of a current encryption configuration of the recipient software application from the encryption services subsystem. The message broker subsystem may use the acquired data to determine whether to encrypt the message before the message is routed to the recipient software application.

If the data representative of the current encryption configuration of the recipient software application indicates that the recipient software application is currently configured to accept encrypted messages, the message broker subsystem may encrypt and route the message to the recipient software application over a secure connection. Alternatively, if the data representative of the current encryption configuration of the recipient software application indicates that the recipient software application is not currently configured to accept encrypted messages, the message broker subsystem may route the message to the recipient software application as cleartext over a non-secure connection.

As used herein, the term "software application" may refer to any software instance such as, but not limited to, a software product (e.g., a software program), a module within a software product, and/or any other software component (e.g. an enterprise java bean, a servlet, etc.) as may serve a particular application. As used herein, an "originating software application" is one that generates a message to be sent to another software application (referred to herein as a "recipient software application").

A "message" generated by a software application may include any data that may be read or otherwise processed by a message broker subsystem and/or a recipient software application. A message may be transmitted in encrypted form or as cleartext (i.e., non-encrypted form).

FIG. 1 illustrates an exemplary broker-based messaging system 100 (or simply "system 100"). As shown in FIG. 1, system 100 may include a software application subsystem 102, a message broker subsystem 104, and an encryption services subsystem 106 configured to communicate with one another. Software application subsystem 102 may be configured to maintain and/or execute a plurality of software applications. Message broker subsystem 104 may be configured to function as message-oriented middleware and facilitate routing of one or more messages between the software applications. Encryption services subsystem 106 may be configured to maintain data representative of current encryption configurations of the software applications and of the message broker subsystem 104. As will be described in more detail below, system 100 may facilitate selective determination at run time of a software application whether to encrypt a message to be transmitted from the software application to another software application via message broker subsystem 104.

System 100, including software application subsystem 102, message broker subsystem 104, and encryption services subsystem 106, may include any computer hardware and/or computer-implemented instructions (e.g., software), or combinations of computer-implemented instructions and hardware, configured to perform one or more of the processes described herein. For example, system 100, including software application subsystem 102, message broker subsystem 104, and encryption services subsystem 106, may include computer hardware (e.g., one or more computing devices) configured to perform one or more of the processes described herein. In some examples, system 100 may be implemented on one physical computing device or may be implemented on more than one physical computing device. Accordingly, system 100 may include any number of computing devices, and may employ any of a number of computer operating systems.

One or more of the processes described herein may be implemented at least in part as instructions executable by one or more computing devices. In general, a processor (e.g., a microprocessor) receives instructions, from a computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other medium from which a computer can read.

Software application subsystem 102, message broker subsystem 104, and encryption services subsystem 106 may communicate using any communication platforms and technologies suitable for transporting data, including known communication technologies, devices, media, and protocols supportive of remote or local data communications. Examples of such communication technologies, devices, media, and protocols include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Ethernet, and any other suitable communications technologies, devices, media, and protocols.

In some examples, software application subsystem 102, message broker subsystem 104, and encryption services subsystem 106 may communicate via one or more networks, including, but not limited to, wireless networks, broadband networks, closed media networks, cable networks, satellite networks, the Internet, intranets, local area networks, public networks, private networks, optical fiber networks, and/or any other networks capable of carrying data and communications signals between software application subsystem 102, message broker subsystem 104, and encryption services subsystem 106.

Figure 2:
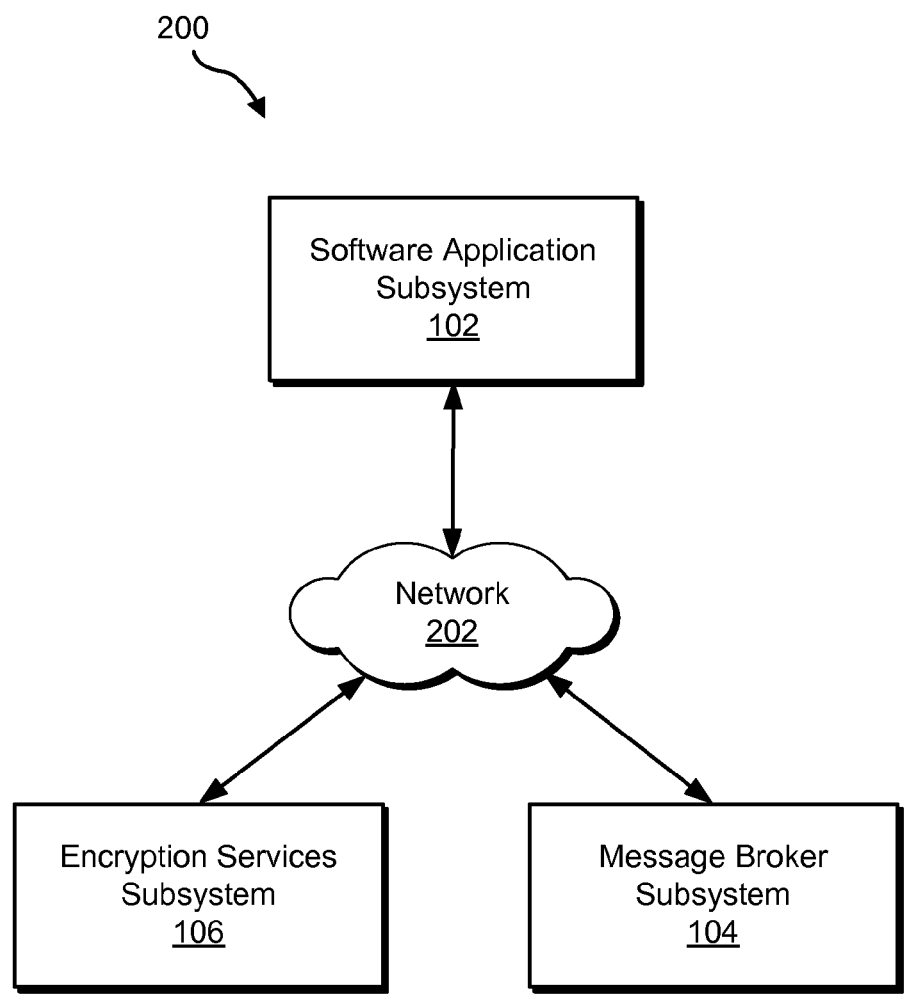
FIG. 2 shows an exemplary implementation of the system of FIG. 1 according to principles disclosed herein.

FIG. 2 shows an exemplary implementation 200 of system 100 wherein software application subsystem 102, message broker subsystem 104, and encryption services subsystem 106 are communicatively coupled via a network 202. Network 202 may include one or more networks, including, but not limited to, any of the networks listed above. Communications between software application subsystem 102, message broker subsystem 104, and encryption services subsystem 106 may be transported using any one of above-listed networks, or any combination or sub-combination of the above-listed networks. In some examples, software application subsystem 102, message broker subsystem 104, and/or encryption services subsystem 106 may be implemented at least in part on one or more servers or other network-enabled devices.

Figure 3:
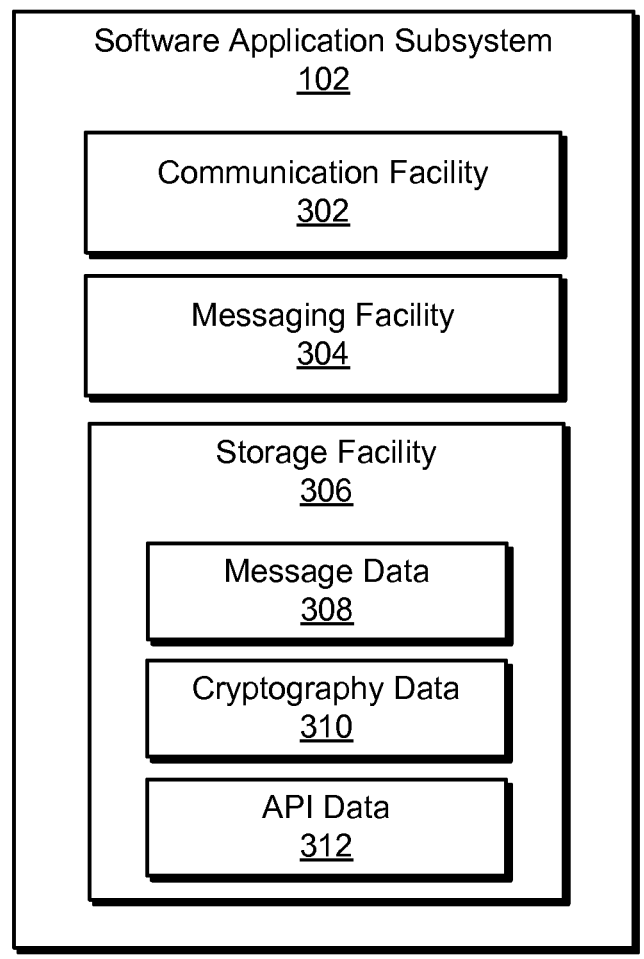
FIG. 3 illustrates exemplary components of a software application subsystem according to principles disclosed herein.

FIG. 3 illustrates exemplary components of software application subsystem 102. As shown in FIG. 3, software application subsystem 102 may include a communication facility 302, a messaging facility 304, and a storage facility 306, which may be in communication with one another using any suitable communication technologies. It will be recognized that although facilities 302-306 are shown to be separate facilities in FIG. 3, any of those facilities may be combined into a single facility as may serve a particular application.

Communication facility 302 is configured to facilitate communication between software application subsystem 102 and message broker subsystem 104. For example, communication facility 302 may be configured to establish one or more secure and/or non-secure connections between software application subsystem 102 and message broker subsystem 104 over which one or more messages may be transmitted from software application subsystem 102 to message broker subsystem 104. An exemplary secure connection includes, but is not limited to, a secure sockets layer ("SSL") connection. An exemplary non-secure connection includes, but is not limited to, a non-SSL connection. Additionally or alternatively, as will be explained in more detail below, communication facility 302 may be configured to facilitate reception of a message by a software application.

Communication facility 302 may additionally or alternatively be configured to facilitate communication between software application subsystem 102 and encryption services subsystem 106. For example, as will be described in more detail below, communication facility 302 may be configured to transmit a request to encryption services subsystem 106 to route a message generated by an originating software application to a recipient software application through message broker subsystem 104.

Messaging facility 304 may be configured to process a message generated by an originating software application and/or a message received by a recipient software application. Exemplary, but not exclusive, processing of a message that may be performed by messaging facility 304 includes encrypting the message, decrypting the message, preparing the message for transmission to a recipient software application via message broker subsystem 104, etc.

To illustrate, in some examples, it may be desirable to transmit a message generated by an originating software application in encrypted form to a recipient software application via message broker subsystem 104. However, in some instances, as will be described in more detail below, message broker subsystem 104 may not be currently configured to accept encrypted messages.

Hence, before a message is transmitted, messaging facility 304 may be configured to determine a current encryption configuration of message broker subsystem 104 by directing communication facility 302 to transmit a request to encryption services subsystem 106 to route the message generated by the originating software application to the recipient software application through message broker subsystem 104. The request may include a request for data representative of a current encryption configuration of message broker subsystem 104. In response to the request, messaging facility 304 may acquire data representative of the current encryption configuration of message broker subsystem 104 from encryption services subsystem 106.

As will be described in more detail below, the data representative of the current encryption configuration of message broker subsystem 104 may indicate whether message broker subsystem 104 is currently accepting encrypted messages and/or one or more encryption preferences and/or settings of message broker subsystem 104. For example, the data representative of the current encryption configuration of message broker subsystem 104 may additionally include data representative of one or more keys, one or more digital certificates, one or more listening ports and/or other encryption parameters used or recognized by message broker subsystem 104.

It will be recognized that message broker subsystem 104 may at times be configured to accept encrypted messages while at other times configured to not accept encrypted messages. For example, message broker subsystem 104 may be generally configured to accept encrypted messages, but when an error occurs with one or more digital certificates and/or encryption keys used to encrypt and/or decrypt messages, message broker subsystem 104 may be selectively configured to not accept encrypted messages. Message broker subsystem 104 may be selectively configured to not accept encrypted messages for any other reason as may serve a particular application.

Messaging facility 304 may be further configured to use the data representative of the current encryption configuration of message broker subsystem 104 to determine during a run time of the originating software application whether to encrypt the message generated by messaging facility 304 prior to the message being transmitted to message broker subsystem 104 for routing to the recipient software application. Messaging facility 304 may use one or more additional factors to make the determination. For example, messaging facility 304 may make the determination whether to encrypt a message based on an encryption capability of messaging facility 304, a subnet of which software application subsystem 102 is a part, and/or any other factor as may serve a particular application.

If the data representative of the current encryption configuration of message broker subsystem 104 indicates that message broker subsystem 104 is currently configured to receive encrypted messages, messaging facility 304 may encrypt the message and direct communication facility 302 to transmit the encrypted message to message broker subsystem 104. Alternatively, if the data representative of the current encryption configuration of message broker subsystem 104 indicates that message broker subsystem 104 is not currently configured to receive encrypted messages, messaging facility 304 may direct the communication facility to transmit the encrypted message to message broker subsystem 104 as cleartext.

Messaging facility 304 may encrypt a message using any suitable encryption process or heuristic as may serve a particular application. For example, messaging facility 304 may utilize one or more keys and/or digital certificates to perform the encryption. Encryption of a message may prevent, or at least deter, unauthorized access to the message.

As shown in FIG. 3, storage facility 306 may be configured to maintain message data 308, cryptography data 310, and application programming interface ("API") data 312. It will be recognized that storage facility 306 may maintain additional or alternative data as may serve a particular application.

Message data 308 includes data representative of one or more messages generated and/or received by a software application. Message data 308 may additionally include routing instructions corresponding to one or more messages. For example, message data 308 may include a name or identification number of a recipient software application and/or computing device that executes the recipient software application.

Cryptography data 310 may include the data representative of the encryption configuration of message broker subsystem 104, one or more keys, one or more digital certificates, one or more listening ports and/or other parameters used by messaging facility 304 to encrypt and/or decrypt one or more messages.

API data 312 is representative of one or more APIs configured to facilitate integration of one or more software applications executed by software application subsystem 102 with message broker subsystem 104 and/or encryption services subsystem 106. For example, one or more APIs may interface with one or more software applications executed by application subsystem 102 to facilitate encryption of messages generated by the one or more software applications, communication with message broker subsystem 104 and/or encryption services subsystem 106, and/or any other feature as may serve a particular application. In this manner, for example, a software application that does not already have encryption capabilities may enable encryption and/or decryption of messages without any modification to the actual software application.

Figure 4:
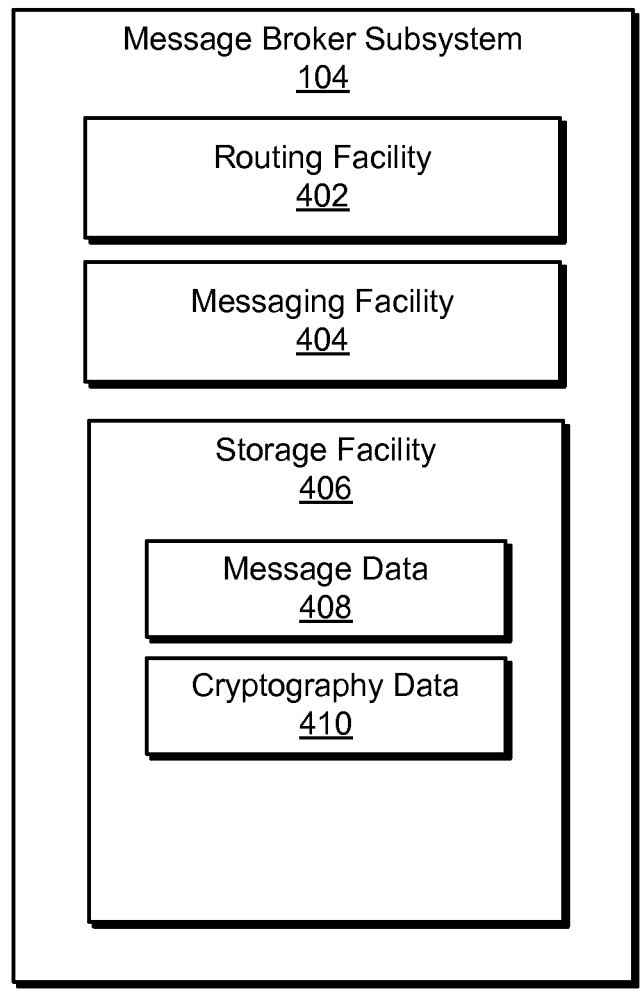
FIG. 4 illustrates exemplary components of a message broker subsystem according to principles disclosed herein.

FIG. 4 illustrates exemplary components of message broker subsystem 104. As shown in FIG. 4, message broker subsystem 104 may include a routing facility 402, a messaging facility 404, and a storage facility 406, which may be in communication with one another using any suitable communication technologies. It will be recognized that although facilities 402-406 are shown to be separate facilities in FIG. 4, any of those facilities may be combined into a single facility as may serve a particular application.

Routing facility 402 is configured to receive a message generated by an originating software application. The message may include routing instructions directing routing facility 402 to route the message to a recipient software application. Routing facility 302 may be further configured to route the message to a recipient software application in accordance with the routing instructions. In some examples, routing facility 302 may be configured to establish one or more secure and/or non-secure connections between message broker subsystem 104 and software application subsystem 102.

Messaging facility 404 may be configured to process a message received by routing facility 402. Exemplary, but not exclusive, processing of a message that may be performed by messaging facility 404 includes decrypting the message, encrypting message, preparing the message for routing to a recipient software application, etc.

To illustrate, in some examples, messaging facility 404 may be configured to decrypt an encrypted message transmitted thereto from software application subsystem 102 and determine that the message should be routed to a recipient software application in accordance with the routing instructions included within the message. In some examples, it may be desirable for message broker subsystem 104 to encrypt the message before it is routed to the recipient software application. However, in some instances, the recipient software application may not be currently configured to accept encrypted messages. For example, a relatively old or outdated software application may not be configured to accept encrypted messages. Additionally or alternatively, a software application residing on a software application subsystem 102 within the same subnet or local area network as message broker subsystem 104 may be configured to bypass encryption of a message due to a decreased risk of unauthorized access to the message.

Hence, before a message is encrypted by messaging facility 404, messaging facility 404 may be configured to acquire data representative of a current encryption configuration of the recipient software application from encryption services subsystem 106. For example, messaging facility 404 may direct routing facility 402 to transmit a request to encryption services subsystem 106 to route the message generated by the originating software application to the recipient software application. In response to the request, messaging facility 404 may acquire data representative of a current encryption configuration of the recipient software application. It will be recognized that in some examples, messaging facility 404 may already have the data representative of the current encryption configuration of the recipient software application. In this case, messaging facility 404 does not have to acquire the data representative of the current encryption configuration of the recipient software application before routing the message to the recipient software application.

The data representative of the current encryption configuration of the recipient software application may indicate whether the recipient software application is currently accepting encrypted messages and/or one or more encryption preferences and/or settings of the recipient software application. For example, the data representative of the current encryption configuration of the recipient software application may additionally include data representative of one or more keys, one or more digital certificates, one or more listening ports and/or other encryption parameters accepted used or recognized by the recipient software application.

Messaging facility 404 may be further configured to use the data representative of the current encryption configuration of the recipient software application to determine whether to encrypt a message before routing the message to the recipient software application.

If the data representative of the current encryption configuration of the recipient software application indicates that the recipient software application is currently configured to receive encrypted messages, messaging facility 404 may encrypt the message and direct routing facility 402 to transmit the encrypted message to the recipient software application. Alternatively, if the data representative of the current encryption configuration of the recipient software application indicates that the recipient software application is not currently configured to receive encrypted messages, messaging facility 404 may direct the communication facility to transmit the message to the recipient software application as cleartext.

Messaging facility 404 may encrypt a message using any suitable encryption process or heuristic as may serve a particular application. For example, messaging facility 404 may utilize one or more keys and/or digital certificates to perform the encryption.

As shown in FIG. 4, storage facility 406 may be configured to maintain message data 408 and cryptography data 410. It will be recognized that storage facility 406 may maintain additional or alternative data as may serve a particular application.

Message data 408 includes data representative of one or more messages received by routing facility 402. As mentioned, message data 408 may additionally include routing instructions corresponding to one or more messages.

Cryptography data 410 may include the data representative of the encryption configuration of the recipient software application, one or more keys, one or more digital certificates, one or more listening ports and/or other parameters used by messaging facility 404 to encrypt and/or decrypt one or more messages.

Figure 5:
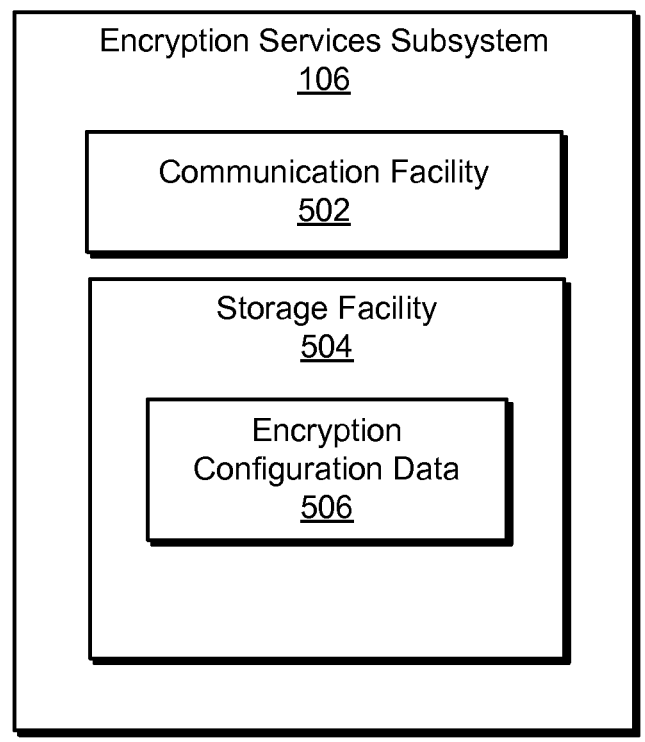
FIG. 5 illustrates exemplary components of an encryption services subsystem according to principles disclosed herein.

FIG. 5 illustrates exemplary components of encryption services subsystem 106. As shown in FIG. 5, encryption services subsystem 106 may include a communication facility 502 and a storage facility 504, which may be in communication with one another using any suitable communication technologies.

Communication facility 502 may be configured to facilitate communication between encryption services subsystem 106 and software application subsystem 102. Communication facility 502 may be further configured to facilitate communication between encryption services subsystem 106 and message broker subsystem 104.

Storage facility 504 may be configured to maintain encryption configuration data 506 corresponding to message broker subsystem 104 and/or one or more software applications. As will be described in more detail below, encryption configuration data 506 may be dynamically updated by message broker subsystem 104 and/or software application subsystem 102 in response to changes in the encryption configurations thereof. In this manner, as will be described in more detail below, software application subsystem 102 may determine during a run time or execution of an originating software application whether to encrypt a message generated by the originating software application before the message is transmitted to message broker subsystem 104 for routing to a recipient software application.

As mentioned, software application subsystem 102, message broker subsystem 104, and encryption services subsystem 106 may each be implemented on one or more computing devices. For example, software application subsystem 102 may be implemented on a first computing device configured to execute an originating software application and a second computing device configured to execute a recipient software application. Alternatively, software application subsystem 102 may be implemented on a single computing device configured to execute both the originating and recipient software applications.

In some examples, software application subsystem 102, message broker subsystem 104, and encryption services subsystem 106 are implemented on distinct computing devices. Alternatively, subsystems 102-106 may be implemented on the same computing device. Any other implementation of subsystems 102-106 may be realized in accordance with the systems and methods described herein.

Figure 6:
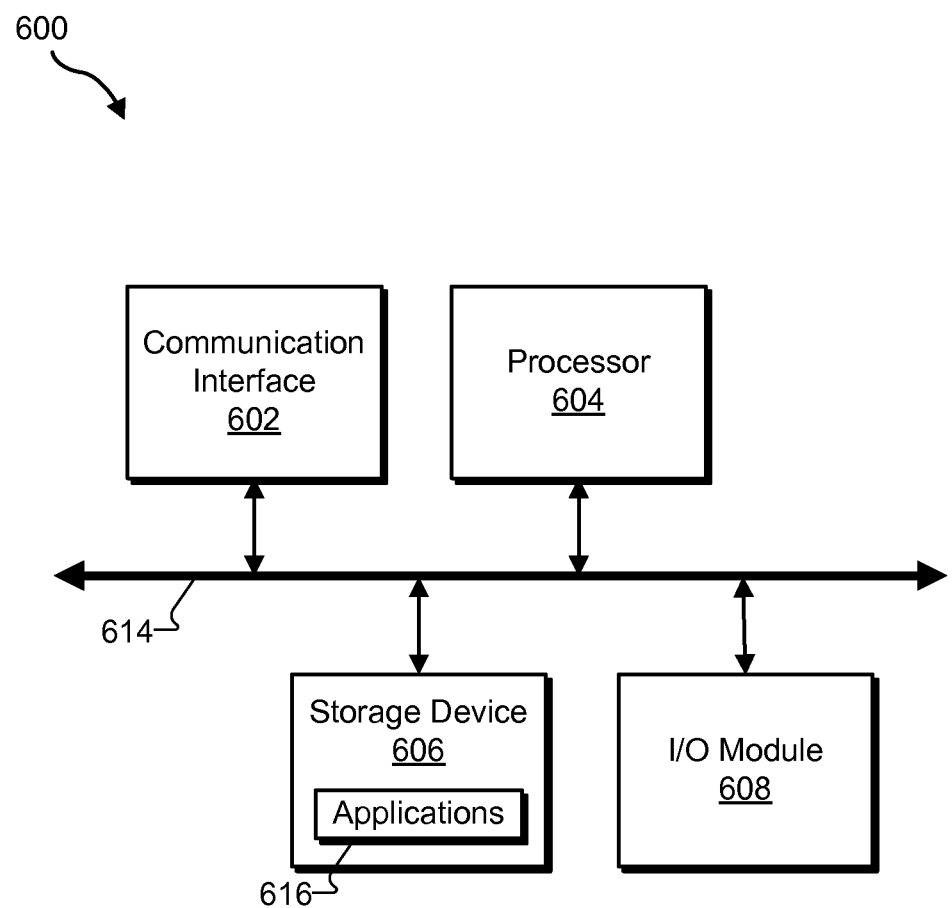
FIG. 6 illustrates an exemplary computing device according to principles disclosed herein.

FIG. 6 illustrates an exemplary computing device 600 that may have any combination of software application subsystem 102, message broker subsystem 104, and/or encryption services subsystem 106 implemented thereon. Computing device 600 may include one or more of a client device, a server, a personal computer, a set-top box, a media content processing device, a communications device, an audio file player device, a mobile device (e.g., a mobile phone device), a handheld device, a phone device, a personal-digital assistant device, a gaming device, a television device, and/or any other computing device configured to perform one or more of the processes and/or operations described herein.

While an exemplary computing device 600 is shown in FIG. 6, the components illustrated in FIG. 6 are not intended to be limiting. Additional or alternative components may be used in other embodiments. Components of computing device 600 shown in FIG. 6 will now be described in additional detail.

Communication interface 602 may be configured to communicate with one or more computing devices. In particular, communication interface 602 may be configured to transmit and/or receive one or more messages, encryption configuration data, communication signals, and/or other data. Examples of communication interface 602 include, without limitation, a wired network interface (such as a network interface card), a wireless network interface (such as a wireless network interface card), a modem, and any other suitable interface. In at least one embodiment, communication interface 602 may provide a direct connection between two or more of subsystems 102-106 via a direct link to a network, such as the Internet. Communication interface 602 may additionally or alternatively provide such a connection through, for example, a local area network (such as an Ethernet network), a personal area network, a telephone or cable network, a cellular telephone connection, a satellite data connection, a dedicated URL, or any other suitable connection. Communication interface 602 may be configured to interface with any suitable communication media, protocols, and formats, including any of those mentioned above.

Processor 604 generally represents any type or form of processing unit capable of processing data or interpreting, executing, and/or directing execution of one or more of the instructions, processes, and/or operations described herein. Processor 604 may direct execution of operations in accordance with one or more applications 616 or other computer-executable instructions such as may be stored in storage device 606 or another computer-readable medium. As an example, processor 604 may be configured to process data representative of a message generated by a software application, including encrypting, decrypting, and/or parsing the data.

Storage device 606 may include one or more data storage media, devices, or configurations and may employ any type, form, and combination of data storage media and/or device. For example, storage device 606 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 606. For example, data representative of one or more executable applications 616 (which may include, but are not limited to, one or more of the software applications described herein) configured to direct processor 604 to perform any of the operations described herein may be stored within storage device 606. In some examples, data may be arranged in one or more databases residing within storage device 606.

I/O module 608 may be configured to receive user input and provide user output and may include any hardware, firmware, software, or combination thereof supportive of input and output capabilities. For example, I/O module 608 may include hardware and/or software for capturing user input, including, but not limited to, a keyboard or keypad, a touch screen component (e.g., touch screen display), a receiver (e.g., an RF or infrared receiver), and/or one or more input buttons.

I/O module 608 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 608 is configured to provide graphical data to a display for presentation to a user. The graphical data may be representative of one or more graphical user interfaces ("GUIs"), GUI views, media content views, and/or any other view as may serve a particular application.

In some examples, any of the facilities described herein may be implemented by or within one or more components of computing device 600. For example, one or more applications 616 residing within storage device 606 may be configured to direct processor 604 to perform one or more processes or functions associated with communication facility 302, messaging facility 304, routing facility 402, messaging facility 404, and/or communication facility 502. Likewise, storage facility 306, storage facility 406, and/or storage facility 504 may be implemented by or within storage device 606.

Figure 7:
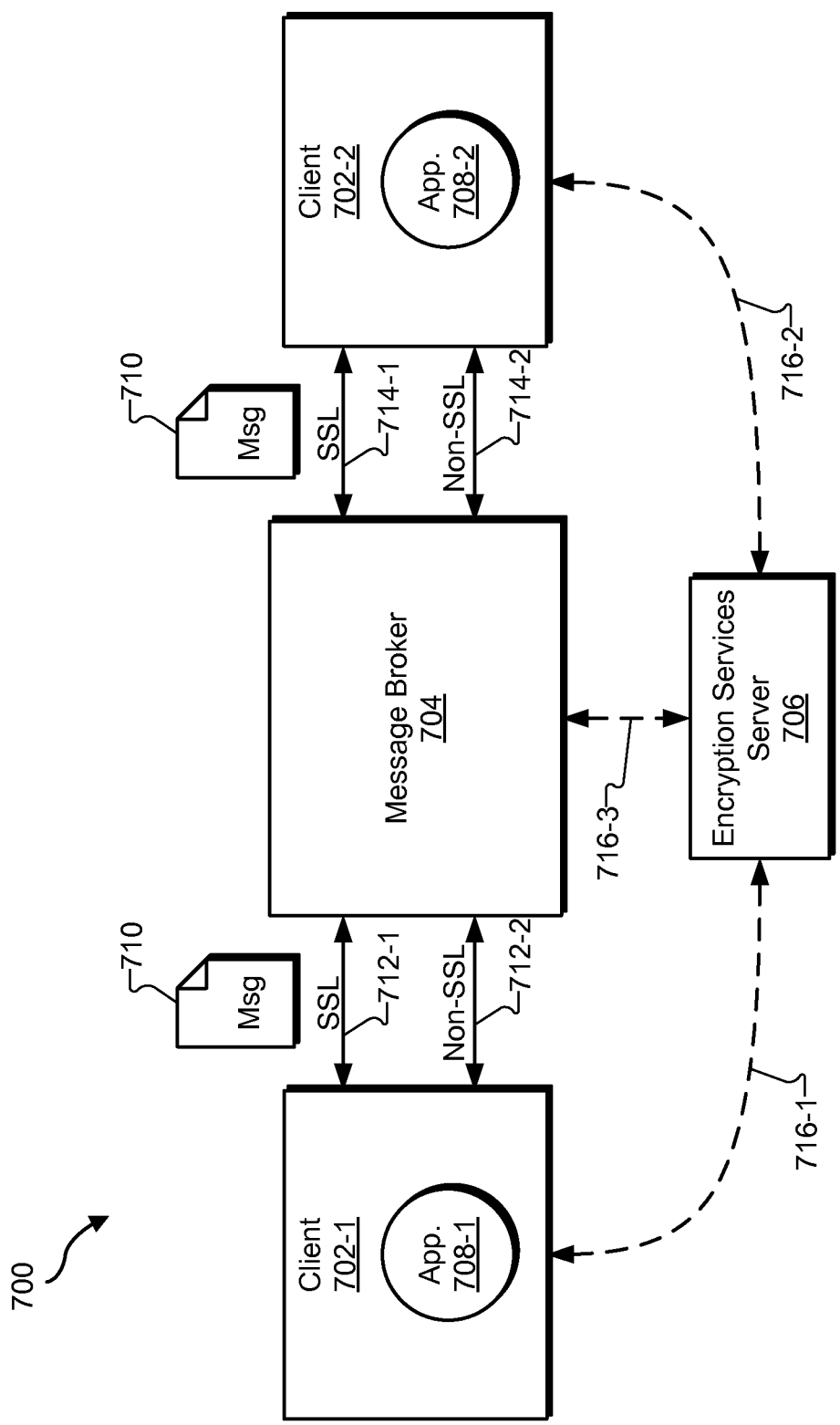
FIG. 7 illustrates another exemplary implementation of the system of FIG. 1 according to principles disclosed herein.

FIG. 7 illustrates an exemplary implementation 700 of system 100. As shown in FIG. 7, clients 702-1 and 702-2 (collectively referred to herein as "clients 702"), a message broker 704, and an encryption services server 706 may be communicatively coupled one to another. Software application subsystem 102 may be implemented on clients 702, message broker subsystem 104 may be implemented on message broker 704, and encryption services subsystem 106 may be implemented on encryption services server 706.

As shown in FIG. 7, client 702-1 may be configured to execute a software application 708-1. Software application 708-1 may reside within client 702-1, as depicted in FIG. 7, or may be located within any other subsystem or device. Software application 708-1 may be configured to generate a message 710 that is to be transmitted to another software application 708-2 executed by and/or residing within client 702-2. Hence, software application 708-1 may be referred to as an originating software application and software application 708-2 may be referred to as a recipient software application.

Software applications 708-1 and 708-2 may have different encryption capabilities and preferences. For example, software application 708-1 may be relatively new and employ a particular type of encryption within a particular computing platform. Software application 708-2, on the other hand, may have been developed years before software application 708-1 and within a different computing platform that employs a different type of encryption. Alternatively, software application 708-2 may not be configured to accept encrypted messages at all.

Configuring both software applications 708-1 and 708-2 (collectively "software applications 708") to interface directly one with another may be costly, difficult, cumbersome, and sometimes impossible. Hence, messages may be transmitted between software applications 708 via message broker 704, which is configured to interface with both software applications 708. To this end, client 702-1 may be configured to selectively establish one or more connections 712 (e.g., secure connection 712-1 and/or non-secure connection 712-2) with the message broker 704. Message broker 704 may in turn selectively establish one or more connections 714

(e.g., secure connection 714-1 and/or non-secure connection 714-2) with client 702-2. Message 710 may be transmitted from software application 708-1 to software application 708-2 via one or more of connections 712 and 714. While secure connections 712-1 and 714-1 are shown in FIG. 7 to include SSL connections, it will be recognized that secure connections 712-1 and 714-1 may additionally or alternatively include any other type of secure connection as may serve a particular application.

As mentioned, it may be desirable to transmit message 710 in encrypted form from software application 708-1 to software application 708-2. However, software application 708-1, message broker 704, and software application 708-2 may have differing encryption configurations. Moreover, these encryption configurations may change depending on the particular message being transmitted, the physical locations of each of the software applications 708, the availability of digital certificates and/or keys used in encryption, and/or any other factor.

Hence, encryption services server 706 is configured to maintain data representative of current encryption configurations of software applications 708 and message broker 704. Each time one of the encryption configurations changes, updated encryption configuration data is transmitted to encryption services server 706 by clients 702 and/or message broker 704 so that encryption services server 706 includes up-to-date encryption configuration data corresponding to software applications 708 and message broker 704.

Encryption services server 706 facilitates a determination by client 702-1 during a run time of software application 708-1 of whether to encrypt message 710 before message 710 is transmitted to message broker 704 for routing to software application 708-2. Determination of whether to encrypt message 710 during a run time of software application 708-1 provides enhanced flexibility, efficiency, and interoperability for software applications 708. For example, in some instances, reception of message 710 in cleartext form is acceptable for software application 708-2. By making a determination that message 710 does not have to be encrypted by message broker 704 during a run time of software application 708-1, processing associated with unnecessary encryption of message 710 may be avoided.

In some examples, connections 716-1 through 716-3 (collectively referred to herein as "connections 716") may be established by clients 702 and message broker 704 to communicate with encryption services server 706. Data representative of encryption configurations of software applications 708 and message broker 704 may be transmitted to encryption services server 706 over one or more of connections 716 in order to update the data maintained by encryption services server 706. Data representative of encryption configurations of software applications 708 and message broker 704 may also be acquired by clients 702 and/or message broker 704 over one or more of connections 716.

To illustrate, when software application 708-1 generates message 710 to be transmitted to application 708-2, client 702-1 may acquire data representative of a current encryption configuration of message broker 704 and/or application 708-2 via connection 716-1. Client 702-1 may use this data to determine whether to encrypt message 710 before it is transmitted to message broker 704 or to transmit message 710 as cleartext to message broker 704. Depending on the determination, client 702-1 may establish either a secure connection 712-1 or a non-secure connection 712-2 between client 702-1 and message broker 704.

For example, it may be desirable for client 702-1 to transmit message 710 to message broker 704 in an encrypted form. Client 702-1 may transmit a request for the current encryption configuration of message broker 704 to encryption services server 706 via connection 716-1. In response, encryption services server 706 may transmit data representative of a current encryption configuration of message broker 704 to client 702-1. Client 702-1 may process the received data to determine whether to encrypt message 710 prior to transmitting the message 710 to message broker 704.

If the data representative of the encryption configuration of message broker 704 indicates that message broker 704 is currently configured to receive encrypted messages, client 702-1 may encrypt message 710 in accordance with an encryption process specified within the data representative of the current encryption configuration of message broker 704. For example, the data may include data representative of one or more digital certificates and/or keys to be used in the encryption of message 710. The data representative of the current encryption configuration of message broker 704 may additionally or alternatively include data indicative of a listening port over which the encrypted message 710 is to be transmitted. Based on this information, client 702-1 may establish a secure connection (e.g., secure connection 712-1) with message broker 704 over which the encrypted message 710 is transmitted.

Alternatively, if the data representative of the current encryption configuration of message broker 704 indicates that message broker 704 is not currently configured to accept encrypted messages, client 702-1 may establish a non-secure connection (e.g., non-secure connection 712-2) over which message 710 may be transmitted to message broker 704 as cleartext.

Upon receiving message 710, message broker 704 may process the routing instructions included within message 710 to determine that message 710 is to be routed to software application 708-2 residing within client 702-2. If message 710 is received in an encrypted form, message broker 704 may decrypt message 710 to access the routing instructions included therein. Message broker 704 may then acquire data representative of a current encryption configuration of software application 702-2 from encryption services server 706 via connection 716-3. If the acquired encryption configuration data indicates that software application 708-2 is currently configured to receive encrypted messages, message broker 704 may encrypt message 710 in accordance with the encryption configuration of software application 708-2, establish a secure connection (e.g., secure connection 714-1) with client 702-2, and route the encrypted message 710 to software application 708-2 over secure connection 714-1. Alternatively, if the acquired encryption configuration data indicates that software application 708-2 is not currently configured to receive encrypted messages, message broker 704 may establish a non-secure connection (e.g., non-secure connection 714-2) and route message 710 to software application 708-2 as cleartext over connection 714-2.

Figure 8:
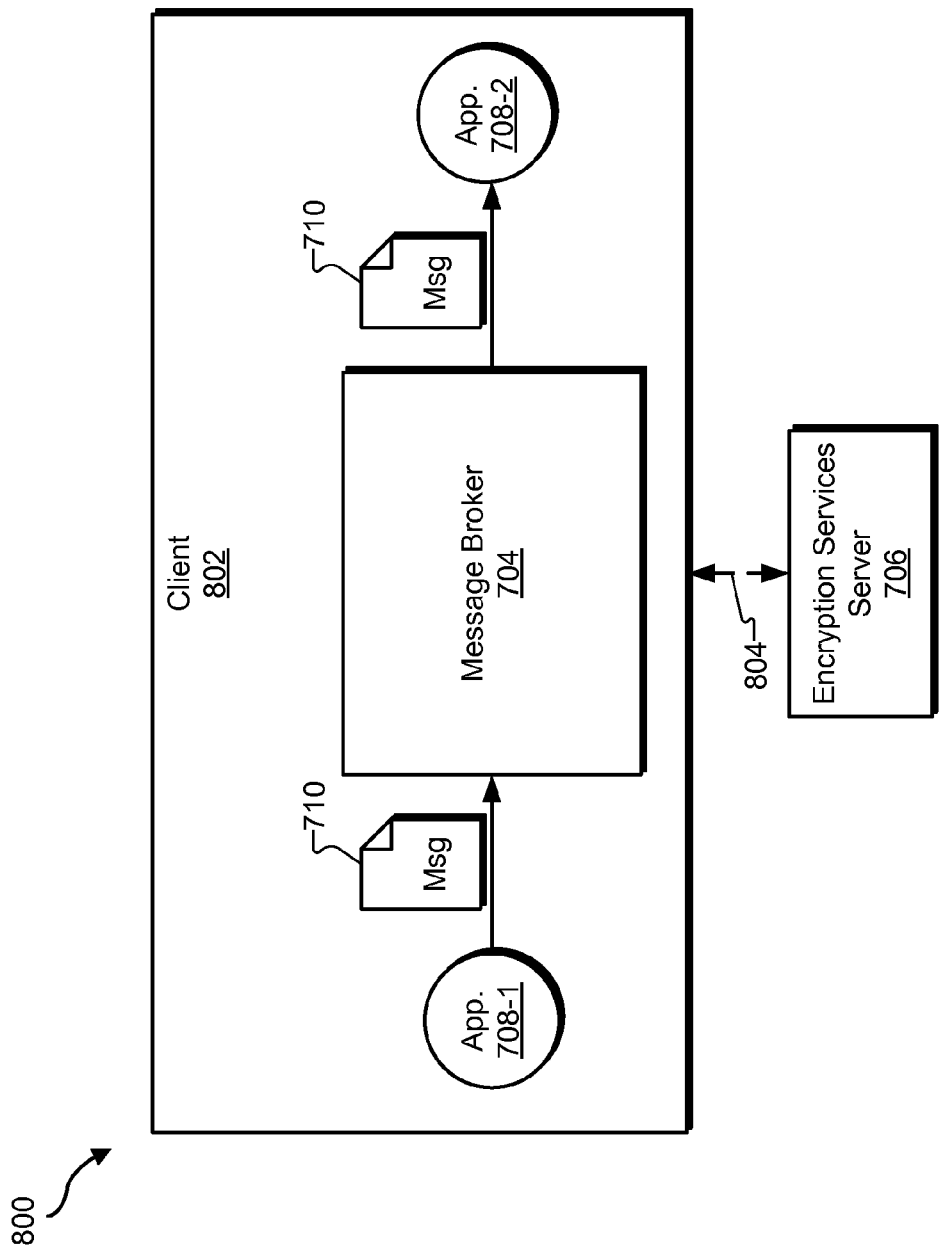
FIG. 8 illustrates another exemplary implementation of the system of FIG. 1 according to principles disclosed herein.

FIG. 8 illustrates another exemplary implementation 800 of system 100. As shown in FIG. 8, software application 708-1, software application 708-2, and message broker 704 are all implemented on a single client 802. As in the previous example, application 708-1 may generate and transmit message 710 to software application 708-2 via message broker 704. To this end, client 802 is configured to communicate with encryption services server 706 over connection 804. Client 802 may acquire data representative of a current encryption configuration of either one of software applications 708 and/or message broker 704 via connection 804 in order to facilitate selective encryption of message 710 by software application 708-1 and/or by message broker 704.

Figure 9:
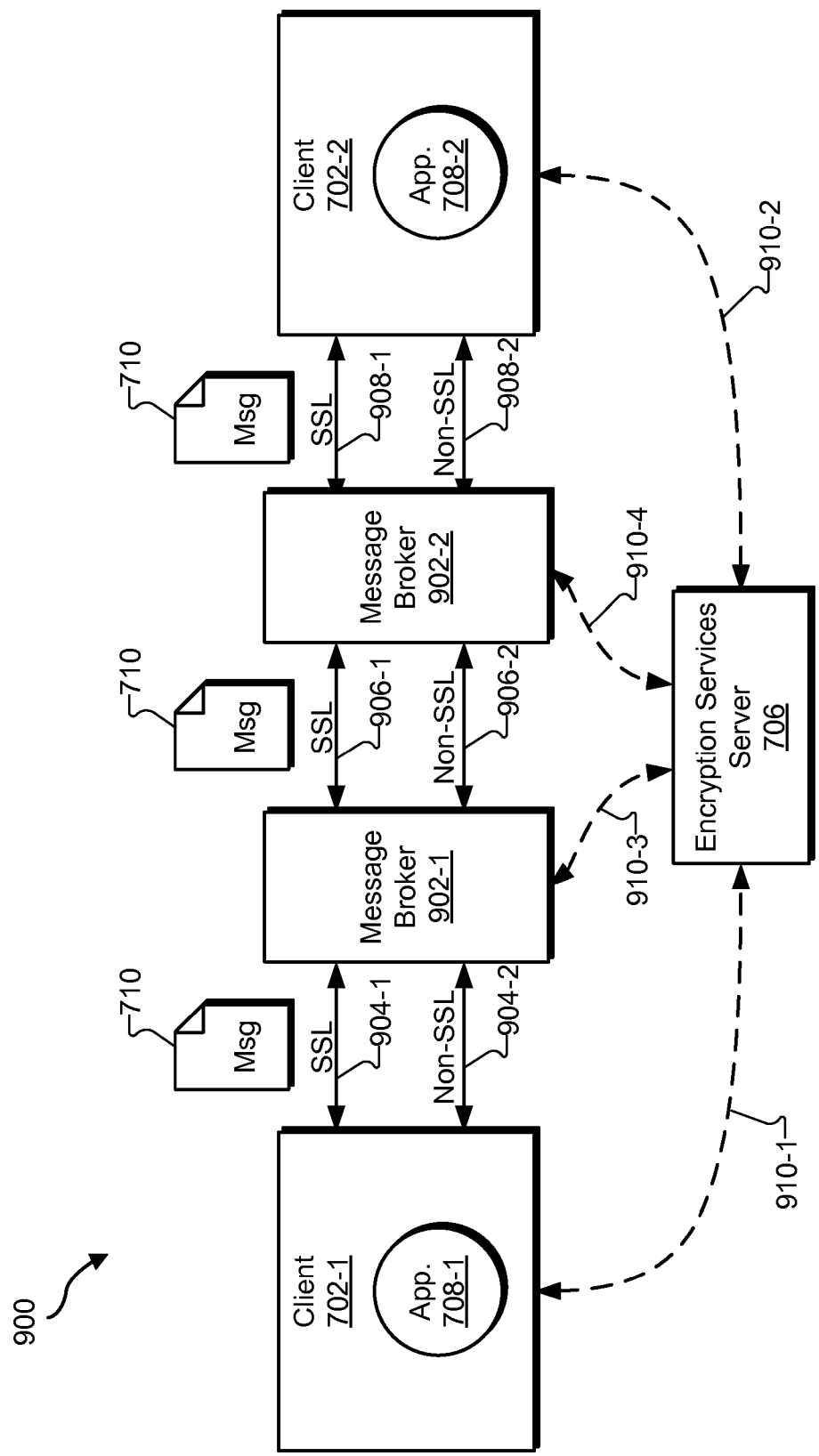
FIG. 9 illustrates another exemplary implementation of the system of FIG. 1 according to principles disclosed herein.

FIG. 9 illustrates another exemplary implementation 900 of system 100 wherein message broker subsystem 104 is implemented on multiple computing devices. For example, message broker subsystem 104 may be implemented on message brokers 902-1 and 902-2 (collectively "message brokers 902"). Multiple message brokers 902 may be utilized when clients 702-1 and 702-2 are included within different platforms, different geographic regions, and/or for any other reason as may serve a particular network architecture.

Each message broker 902 is associated with one or more software applications 708. For example, message broker 902-1 may be associated with software application 708-1 and message broker 902-2 may be associated with software application 708-2. Hence, to transmit message 710 from software application 708-1 to software application 708-2, client 702-1 may transmit the message 710 to message broker 902-1 over a secure connection 904-1 and/or a non-secure connection 904-2. Message broker 902-1 may then route message 710 to message broker 902-2 over a secure connection 906-1 and/or a non-secure connection 906-2. Message broker 902-2 may then route message 710 to client 702-2 over a secure connection 908-1 and/or a non-secure connection 908-2 for access by software application 708-2.

In some examples, message 710 may be encrypted during one or more of the transmission or routing stages depicted in FIG. 9. For example, message 710 may be encrypted by client 702-1 before being transmitted to message broker 902-1, by message broker 902-1 before being transmitted to message broker 902-2, and/or by message broker 902-2 before being routed to client 702-2. To this end, connections 910-1 through 910-4 (collectively "connections 910") may be provided to facilitate updating of the current encryption configuration data corresponding to each of the software applications 708 and message brokers 902 that is maintained by encryption services server 706. Connections 910 may additionally be configured to facilitate transmission of the current encryption configuration data to one or more of the clients 702 and/or message brokers 902 so that determinations regarding encryption of message 710 may be made.

As mentioned, a software application residing on a software application subsystem 102 within the same subnet or local area network as message broker subsystem 104 may be configured to bypass encryption of a message due to a decreased risk of unauthorized access to the message. For example, when software application subsystem 102 and broker subsystem 104 are in the same TCP/IP subnet, software application subsystem 102 may determine at run time of the software application to bypass encryption of a message generated by the software application and instead transmit the message to broker subsystem 104 as cleartext. In some examples, software application subsystem 102 and broker subsystem 104 may be considered to be in the same TCP/IP subnet if the first three octets of their respective four octet IP addresses are identical.

Figure 10:
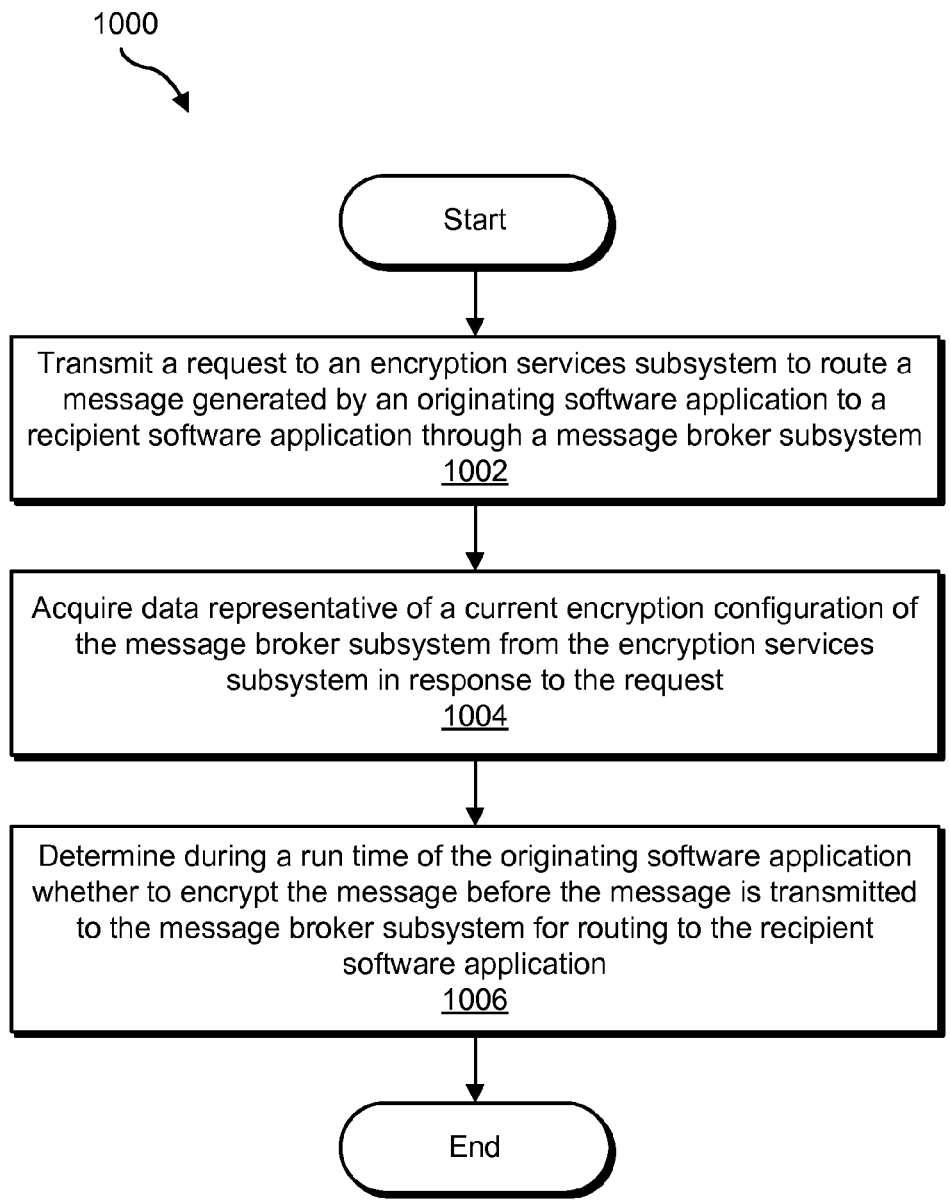
FIG. 10 illustrates an exemplary broker-based messaging method according to principles disclosed herein.

FIG. 10 illustrates an exemplary broker-based messaging method 1000. As will be described below, method 1000 facilitates selective encryption of a message routed from an originating software application to a recipient software application through a message broker subsystem. While FIG. 10 illustrates exemplary steps according to one embodiment, other embodiments may omit, add to, reorder, and/or modify any of the steps shown in FIG. 10.

In step 1002, a request to route a message generated by an originating software application to a recipient software application through a message broker subsystem is transmitted to an encryption services subsystem. Step 1002 may be performed by software application subsystem 102 (e.g., a client configured to execute the originating software application) in communication with the message broker subsystem, which may include message broker subsystem 104. The request may be transmitted to the encryption services subsystem in any of the ways described herein.

In step 1004, data representative of a current encryption configuration of the message broker subsystem is acquired from the encryption services subsystem in response to the request. Step 1004 may be performed by software application subsystem 102 (e.g., a client configured to execute the originating software application) in any of the ways described herein.

In step 1006, a determination is made during a run time of the originating software application whether to encrypt the message before the message is transmitted to the message broker subsystem for routing to the recipient software application. The determination may be made by software application subsystem 102 (e.g., a client configured to execute the originating software application) and may be based at least in part on the current encryption configuration of the message broker subsystem. For example, if the data representative of the current encryption configuration of the message broker subsystem indicates that the message broker subsystem is currently configured to receive encrypted messages, the message may be encrypted and then transmitted to the message broker subsystem by software application subsystem 102. Alternatively, if the data representative of the current encryption configuration of the message broker subsystem indicates that the message broker subsystem is not currently configured to receive encrypted messages, the message may be transmitted as cleartext to the message broker subsystem by software application subsystem 102.

Figure 11:
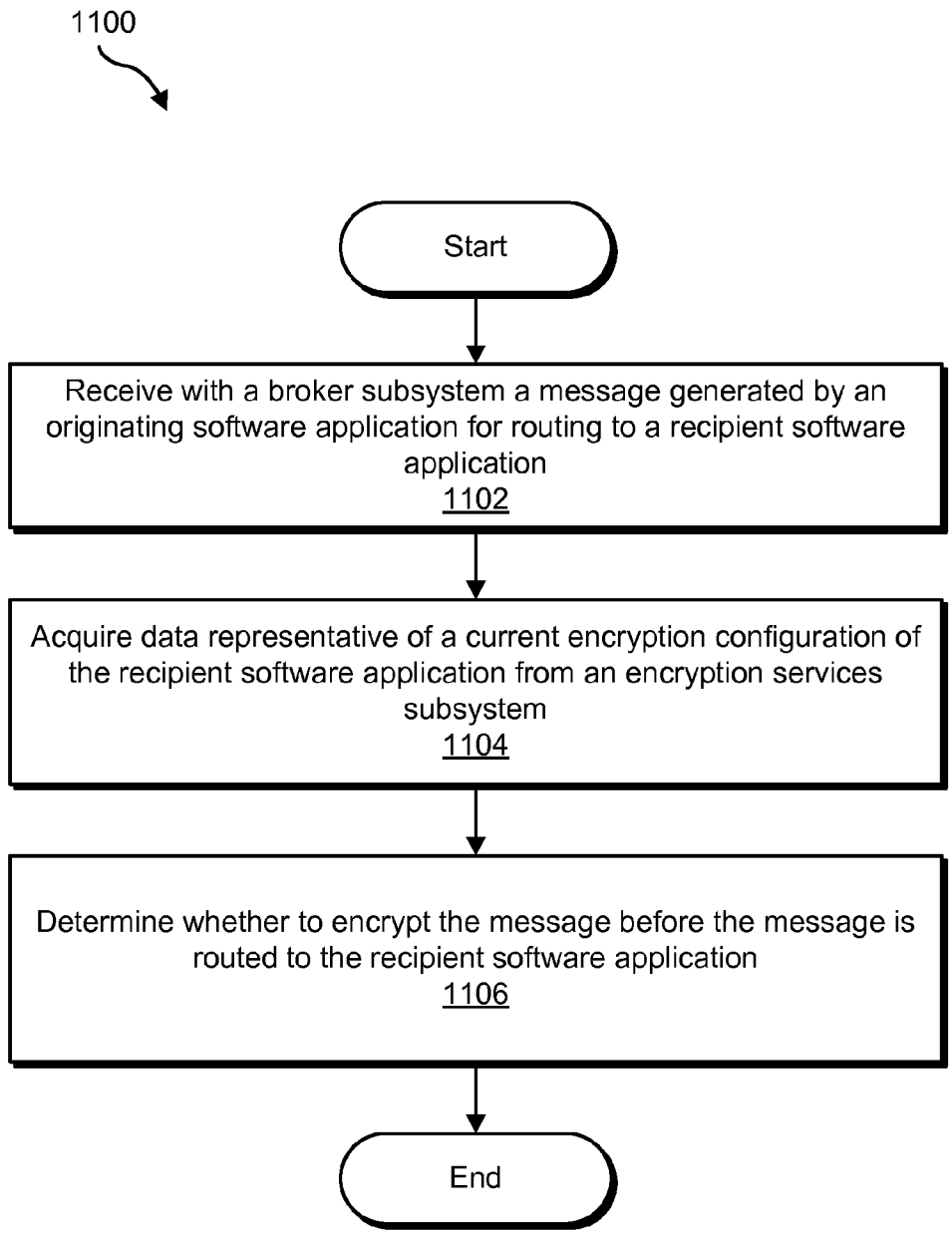
FIG. 11 illustrates another exemplary broker-based messaging method according to principles disclosed herein.

FIG. 11 illustrates another exemplary broker-based messaging method 1100. As will be described below, method 1100 facilitates selective encryption of a message by a broker subsystem before the broker subsystem routes the message to a recipient software application. While FIG. 11 illustrates exemplary steps according to one embodiment, other embodiments may omit, add to, reorder, and/or modify any of the steps shown in FIG. 11.

In step 1102, a message generated by an originating software application is received by a broker subsystem for routing to a recipient software application. For example, broker subsystem 104 may be configured to receive a message generated by an originating software application from software application subsystem 102.

In step 1104, data representative of a current encryption configuration of the recipient software application is acquired from an encryption services subsystem. Step 1104 may be performed by broker subsystem 104. For example, broker subsystem 104 may transmit a request for the data to the encryption services subsystem and receive the data from the encryption services subsystem in response to the request.

In step 1106, a determination is made by the broker subsystem whether to encrypt the message before the message is routed to the recipient software application. The determination may be based at least in part on the current encryption configuration of the recipient software application. For example, if the data representative of the current encryption configuration of the recipient software application indicates that the recipient software application is currently configured to receive encrypted messages, the message may be encrypted and then transmitted to the recipient software application by message broker subsystem 104. Alternatively, if the data representative of the current encryption configuration of the recipient software application indicates that the recipient software application is not currently configured to receive encrypted messages, the message may be transmitted as cleartext to the recipient software application by message broker subsystem 104.

As detailed above, the methods and systems described herein facilitate selective encryption of messages transmitted in broker-based messaging systems. As an example, an exemplary method includes transmitting, by a software application subsystem, a request to an encryption services subsystem to route a message generated by an originating software application to a recipient software application through a message broker subsystem, acquiring, by the software application subsystem, data representative of a current encryption configuration of the message broker subsystem from the encryption services subsystem in response to the request, and determining, by the software application subsystem, during a run time of the originating software application whether to encrypt the message before the message is transmitted to the message broker subsystem for routing to the recipient software application, the determination based at least in part on the current encryption configuration of the message broker subsystem.

Another exemplary method includes receiving, by a message broker subsystem, a message generated by an originating software application, the message comprising routing instructions directing the message broker subsystem to route the message to a recipient software application, acquiring, by the message broker subsystem, data representative of a current encryption configuration of the recipient software application from an encryption services subsystem, and determining, by the message broker subsystem, whether to encrypt the message before the message is routed to the recipient software application, the determination based at least in part on the current encryption configuration of the recipient software application.

An exemplary system includes a communication facility configured to communicate with a message broker subsystem and an encryption services subsystem and a messaging facility selectively and communicatively coupled to the communication facility. The messaging facility is configured to direct the communication facility to transmit a request to the encryption services subsystem to route a message generated by an originating software application to a recipient software application through the message broker subsystem, acquire data representative of a current encryption configuration of the message broker subsystem from the encryption services subsystem in response to the request, and determine during a run time of the originating software application whether to encrypt the message before the message is transmitted to the message broker subsystem for routing to the recipient software application, the determination based at least in part on the current encryption configuration of the message broker subsystem.

Another exemplary system includes a routing facility configured to receive a message generated by an originating software application, the message comprising routing instructions directing the routing facility to route the message to a recipient software application, and a messaging facility selectively and communicatively coupled to the routing facility. The messaging facility is configured to acquire data representative of a current encryption configuration of the recipient software application from an encryption services subsystem and determine whether to encrypt the message before the message is routed to the recipient software application, the determination based at least in part on the current encryption configuration of the recipient software application.

Another exemplary system includes a client having an originating software application residing thereon that generates a message to be routed to a recipient software application residing on another client, a message broker selectively and communicatively coupled to the client and configured to facilitate the routing of the message from the originating software application to the recipient software application, and an encryption services server selectively and communicatively coupled to the client and to the message broker, the encryption services server configured to maintain data representative of a current encryption configuration of the recipient software application and data representative of a current encryption configuration of the message broker. The client is further configured to acquire the data representative of the current encryption configuration of the message broker from the encryption services server and determine during a run time of the originating software application whether to encrypt the message before the message is transmitted to the message broker for routing to the recipient software application, the determination based at least in part on the current encryption configuration of the message broker.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:

transmitting, by a software application subsystem, a request to an encryption services server to route a message generated by an originating software application residing within a first client to a recipient software application residing within a second client through a message broker subsystem separate from the encryption services server, wherein the first client upon which the originating software application resides is configured to communicate directly with the encryption services server to acquire data representative of a current encryption configuration of the message broker subsystem, and the second client upon which the recipient software application resides is configured to communicate directly with the encryption services server to acquire data representative of a current encryption configuration of the recipient software application;

acquiring, by the software application subsystem by way of the direct communication between the first client and the encryption services server, the data representative of the current encryption configuration of the message broker subsystem from the encryption services server in response to the request; and determining, by the software application subsystem, during a run time of the originating software application whether to encrypt or to not encrypt the message before the message is transmitted to the message broker subsystem for routing to the recipient software application, the determination based at least in part on the current encryption configuration of the message broker subsystem and the current encryption configuration of the recipient software application acquired from the encryption services server.

2. The method of claim 1, further comprising encrypting and transmitting, by the software application subsystem, the message to the message broker subsystem if the data representative of the current encryption configuration indicates that the message broker subsystem is currently configured to accept encrypted messages.

3. The method of claim 1, further comprising transmitting, by the software application subsystem, the message in cleartext to the message broker subsystem if the data representative of the current encryption configuration indicates that the message broker subsystem is not currently configured to accept encrypted messages.

4. The method of claim 1, further comprising:
transmitting, by the software application subsystem, the message to the message broker subsystem;
decrypting, by the message broker subsystem, the message if the message is in encrypted form;
acquiring, by the message broker subsystem, data representative of a current encryption configuration of the recipient software application;
determining, by the message broker subsystem, whether to encrypt or to not encrypt the message before the message is routed to the recipient software application, the determination by the message broker subsystem based at least in part on the current encryption configuration of the recipient software application.

5. The method of claim 4, further comprising:
encrypting and routing, by the message broker subsystem, the message to the recipient software application if the data representative of the current encryption configuration of the recipient software application indicates that the recipient software application is currently configured to accept encrypted messages.

6. The method of claim 4, further comprising routing, by the message broker subsystem, the message in cleartext to the recipient software application if the data representative of the current encryption configuration of the recipient software application indicates that the recipient software application is not currently configured to accept encrypted messages.

7. The method of claim 1, further comprising establishing, by the software application subsystem, a secure connection between the software application subsystem and the message broker subsystem if the data representative of the current encryption configuration indicates that the message broker subsystem is currently configured to accept encrypted messages.

8. The method of claim 1, further comprising establishing, by the software application subsystem, a non-secure connection between the software application subsystem and the message broker subsystem if the data representative of the current encryption configuration indicates that the message broker subsystem is not currently configured to accept encrypted messages.

9. The method of claim 1, wherein the determining of whether to encrypt or to not encrypt the message is further based on whether the software application subsystem and message broker subsystem are in the same subnet.

10. The method of claim 1, further comprising updating, by the encryption services server, the data representative of the current encryption configuration of the message broker subsystem when data representative of a change in the current encryption configuration of the message broker subsystem is transmitted to the encryption services server.

11. A method comprising:
receiving, by a message broker subsystem, a message generated by an originating software application residing within a first client, the message comprising routing instructions directing the message broker subsystem to route the message to a recipient software application residing within a second client, wherein the first client upon which the originating software application resides is configured to communicate directly with an encryption services server to acquire data representative of a current encryption configuration of the message broker subsystem, and the second client upon which the recipient software application resides is configured to communicate directly with the encryption services server to acquire data representative of a current encryption configuration of the recipient software application;
acquiring, by the message broker subsystem, the data representative of the current encryption configuration of the recipient software application from the encryption services server separate from the message broker subsystem; and
determining, by the message broker subsystem, whether to encrypt or to not encrypt the message before the message is routed to the recipient software application, the determination based at least in part on the current encryption configuration of the recipient software application acquired from the encryption services server.

12. The method of claim 11, further comprising encrypting and routing, by the message broker subsystem, the message to the recipient software application if the data representative of the current encryption configuration of the recipient software application indicates that the recipient software application is currently configured to accept encrypted messages.

13. The method of claim 11, further comprising routing, by the message broker subsystem, the message in cleartext to the recipient software application if the data representative of the current encryption configuration indicates that the recipient software application is not currently configured to accept encrypted messages.

14. The method of claim 11, further comprising:
updating, by the encryption services server, the data representative of the current encryption configuration of the recipient software application when data representative of a change in the current encryption configuration of the recipient software application is transmitted to the encryption services server.

15. The method of claim 11, wherein the message received by the message broker subsystem is encrypted, and wherein the method further comprises decrypting, by the message broker subsystem, the message to obtain routing information corresponding to the message.

16. A system comprising:
a communication facility configured to communicate with a message broker subsystem and an encryption services server separate from the message broker subsystem; and
a messaging facility selectively and communicatively coupled to the communication facility and configured to direct the communication facility to transmit a request to the encryption services server to route a message generated by an originating software application residing within a first client to a recipient software application residing within a second client through the message broker subsystem, wherein the first client upon which the originating software application resides is configured to communicate directly with the encryption services server to acquire data representative of a current encryption configuration of the message broker subsystem, and the second client upon which the recipient software application resides is configured to communicate directly with the encryption services server to acquire data representative of a current encryption configuration of the recipient software application,
acquire data representative of the current encryption configuration of the message broker subsystem by way of the direct communication between the first client and the encryption services server in response to the request, and determine during a run time of the originating software application whether to encrypt or to not encrypt the message before the message is transmitted to the message broker subsystem for routing to the recipient software application, the determination based at least in part on the current encryption configuration of the message broker subsystem and the current encryption configuration of the recipient software application acquired from the encryption services server.

17. The system of 16, wherein the messaging facility is further configured to encrypt the message and direct the communication facility to transmit the encrypted message to the message broker subsystem if the data representative of the current encryption configuration indicates that the message broker subsystem is currently configured to accept encrypted messages.

18. The system of 16, wherein the messaging facility is further configured to direct the communication facility to transmit the message to the message broker subsystem as cleartext.

19. A system comprising:
a routing facility configured to receive a message generated by an originating software application residing within a first client, the message comprising routing instructions directing the routing facility to route the message to a recipient software application residing within a second client, wherein the first client upon which the originating software application resides is configured to communicate directly with an encryption services server to acquire data representative of a current encryption configuration of the message broker subsystem, and the second client upon which the recipient software application resides is configured to communicate directly with the encryption services server to acquire data representative of a current encryption configuration of the recipient software application;

a messaging facility selectively and communicatively coupled to the routing facility and configured to
acquire the data representative of the current encryption configuration of the recipient software application from the encryption services server separate from the messaging facility, and
determine whether to encrypt or to not encrypt the message before the message is routed to the recipient software application, the determination based at least in part on the current encryption configuration of the recipient software application acquired from the encryption services server.

20. The system of 19, wherein the messaging facility is further configured to encrypt the message and direct the routing facility to route the encrypted message to the recipient software application if the data representative of the current encryption configuration indicates that the recipient software application is currently configured to accept encrypted messages.

21. The system of 19, wherein the messaging facility is further configured to direct the routing facility to route the message to the recipient software application as cleartext if the data representative of the current encryption configuration indicates that the recipient software application is not currently configured to accept encrypted messages.

22. A system comprising:
a first client having an originating software application residing thereon that generates a message to be routed to a recipient software application residing on a second client;
a message broker selectively and communicatively coupled to the client and configured to facilitate the routing of the message from the originating software application to the recipient software application; and
an encryption services server separate from the message broker selectively and communicatively coupled to the first client and to the message broker, the encryption services server configured to maintain data representative of a current encryption configuration of the recipient software application and data representative of a current encryption configuration of the message broker, wherein the first client upon which the originating software application resides is configured to communicate directly with the encryption services server to acquire data representative of the current encryption configuration of the message broker, and the second client upon which the recipient software application resides is configured to communicate directly with the encryption services server to acquire data representative of the current encryption configuration of the recipient software application;
wherein the first client is further configured to
acquire, by way of the direct communication between the first client and the encryption services server, the data representative of the current encryption configuration of the message broker from the encryption services server, and
determine during a run time of the originating software application whether to encrypt or to not encrypt the message before the message is transmitted to the message broker for routing to the recipient software application, the determination based at least in part on the current encryption configuration of the message broker and the current encryption configuration of the recipient software application acquired from the encryption services server.

23. The system of claim 22, wherein the first client is further configured to encrypt and transmit the message to the message broker for routing to the recipient software application if the data representative of the current encryption configuration of the message broker indicates that the message broker is currently configured to accept encrypted messages.

24. The system of claim 22, wherein the message broker comprises:
a first message broker corresponding to the originating software application; and
a second message broker corresponding to the recipient software application;
wherein the first message broker is configured to transmit the message to the second message broker; and
wherein the second message broker is configured to route the message to the recipient software application.

25. The system of claim 24, wherein the first message broker is configured to encrypt or not to encrypt the message before transmitting the message to the second message broker based on a current encryption configuration of the second message broker.

* * * * *